United States Patent
Put et al.

(10) Patent No.: US 9,601,758 B2
(45) Date of Patent: Mar. 21, 2017

(54) NEGATIVE ELECTRODE MATERIAL FOR A RECHARGEABLE BATTERY, AND METHOD FOR PRODUCING IT

(71) Applicant: Umicore, Brussels (BE)

(72) Inventors: Stijn Put, Olmen (BE); Jean-Sebastien Bridel, Geel (BE); Hailei Zhao, Hebei (CN); Jing Wang, Hebei (CN)

(73) Assignee: Umicore, Brussels (BE)

( * ) Notice: Subject to any disclaimer, the term of this patent is extended or adjusted under 35 U.S.C. 154(b) by 83 days.

(21) Appl. No.: 14/652,950

(22) PCT Filed: Dec. 17, 2013

(86) PCT No.: PCT/EP2013/076851
§ 371 (c)(1),
(2) Date: Jun. 17, 2015

(87) PCT Pub. No.: WO2014/095823
PCT Pub. Date: Jun. 26, 2014

(65) Prior Publication Data
US 2015/0340687 A1 Nov. 26, 2015

(30) Foreign Application Priority Data
Dec. 20, 2012 (EP) .................................... 12198559

(51) Int. Cl.
H01M 6/14 (2006.01)
H01M 4/36 (2006.01)
H01M 10/0525 (2010.01)
H01M 4/38 (2006.01)
H01M 4/485 (2010.01)
H01M 4/587 (2010.01)
H01M 4/62 (2006.01)
H01M 10/052 (2010.01)
H01M 4/02 (2006.01)

(52) U.S. Cl.
CPC ............ H01M 4/364 (2013.01); H01M 4/386 (2013.01); H01M 4/485 (2013.01); H01M 4/587 (2013.01); H01M 4/624 (2013.01); H01M 10/052 (2013.01); H01M 10/0525 (2013.01); H01M 2004/027 (2013.01); Y02E 60/122 (2013.01)

(58) Field of Classification Search
CPC ........... H01M 10/052; H01M 10/0525; H01M 2004/027; H01M 4/364; H01M 4/386; H01M 4/485; H01M 4/587; H01M 4/624; Y02E 60/122
See application file for complete search history.

(56) References Cited

U.S. PATENT DOCUMENTS

| 5,204,024 A | 4/1993 | Onaka et al. |
| 7,807,121 B2 | 10/2010 | Nuspl et al. |
| 2006/0068287 A1* | 3/2006 | Morita .................. H01M 4/134 429/223 |
| 2007/0254102 A1 | 11/2007 | Fukuoka et al. |
| 2010/0009261 A1 | 1/2010 | Watanabe |

FOREIGN PATENT DOCUMENTS

WO  WO2012/014381 A1  2/2012

OTHER PUBLICATIONS

Brunauer, S., et al., "Adsorption of Gases in Multimolecular Layers", *J. Am. Chem. Soc.*, vol. 60 (1938), pp. 309-319.
Schnurre, S.M., et al., "Thermodynamics and Phase Stability in the Si—O System", *Journal of Non-Crystalline Solids*, vol. 336 (2004), pp. 1-25.
Wang, J., et al., "Nano-sized $SiO_x$/C Composite Anode for Lithium Ion Batteries", *Journal of Power Sources*, vol. 196 (2011), pp. 4811-4815.
International Search Report for PCT/EP2013/076851, dated Mar. 6, 2014.

* cited by examiner

*Primary Examiner* — Patrick Ryan
*Assistant Examiner* — Ben Lewis
(74) *Attorney, Agent, or Firm* — Brinks Gilson & Lione

(57) ABSTRACT

The invention relates to a negative electrode powder for a lithium-ion rechargeable battery comprising a mixture comprising carbon and $SiO_x$, with $0<x<1$, wherein the $SiO_x$ consists of a nanometric composite of crystalline $SiO_2$ and amorphous Si. The method for preparing the powder comprises the steps of providing an aqueous solution comprising an anti-agglomeration agent, dispersing a silicon comprising organic compound in the aqueous solution, hydrothermally treating the aqueous solution at a temperature between 90 and 180° C. for a period of 0.5 to 24 h, preferably between 110 and 140° C. for a period of 0.5 to 4 h, thereby forming a suspension of $SiO_2$ and Si in the aqueous solution, evaporating the solution, thereby obtaining a slurry, subjecting the slurry to a coking process whereby a solid residue is formed, calcining the solid residue at a temperature between 500 and 1300° C., preferably between 600 and 1000° C., in a non-oxidizing atmosphere.

17 Claims, 12 Drawing Sheets

NEGATIVE ELECTRODE MATERIAL FOR A RECHARGEABLE BATTERY, AND METHOD FOR PRODUCING IT

This application is a National Stage application of International Application No. PCT/EP2013/076851, filed Dec. 17, 2013, which claims the benefit of European Application No. 12198559.2, filed Dec. 20, 2012.

The invention relates to a negative electrode powder for a lithium-ion rechargeable battery comprising a mixture comprising carbon and $SiO_x$, with $0<x<1$, wherein the $SiO_x$ consists of a nanometric composite of crystalline $SiO_2$ and amorphous Si.

TECHNICAL FIELD AND BACKGROUND

A nanocomposite particle of silicon oxide and carbon ($SiO_x/C$) having a core-shell structure and its use as an anode material is known from Jing Wang et al. "*Nano-sized SiO_x/C composite anode for lithium ion batteries*", Journal of Power Sources 196 (2011) 4811-4815. The $SiO_x$ forming the core, presents a structure comprising amorphous Si clusters and ordered $SiO_2$ domains. According to the mentioned publication, the nano feature of the $SiO_x/C$ particles combined with a relatively good electronic conductive nature of the carbon coating layer, ensure a good-rate capability of an electrode containing thereof.

It was however observed that the properties of the negative electrode (anode) material containing the above mentioned core-shell particles can be improved. In particular it was observed that for the known anode material, an efficient lithium percolation is difficult to achieve. It was also observed that having an optimum conductivity is important for achieving good properties and that the conductivity of the known anodes can be further optimized. Moreover, the particles forming the known anodes are difficult and expensive to manufacture.

With the development of mobile electronic equipment, transportation, renewable-energy sectors, there is a strong demand for secondary batteries with higher energy density. Compared to other secondary battery systems, lithium-ion batteries (LIBs) have many advantages in terms of high energy and power densities, long cycle life, low self-discharge, high operating voltage, wide temperature window, and no "memory effect". The state-of-the-art anode material for LIBs is graphite due to its long cycle life, abundant material supply and relatively low cost. However, the graphite anode shows low energy density (372 mAh/g) and safety issues related to lithium deposition under overcharge conditions. Therefore, much attention is paid recently to develop alternative anode materials with enhanced safety, high specific capacity and also long cycle life.

Silicon is of special interest because of its potentially largest theoretical capacity of around 3600 mAh/g for $Li_{15}Si_4$ alloy. However, the application of silicon anodes has been hindered by rapid capacity fading upon charge/discharge cycling. The capacity loss was believed to be mainly due to expansion/contraction of the material during the insertion/extraction of $Li^+$, which leads to a strong mechanical stress of the crystallites and results in the loss of the electrical contact. That eventually results in the rapid loss of reversible capacity upon prolonged cycling. Many strategies have been proposed to improve the cyclability of Si-based anode materials, such as employing nano-technology, alloying with other elements and coating/mixing with carbon.

An alternative material to pure Si is silicon oxide or SiO. So-called "Silicon monoxide" SiO, if it exists, would be the only compound of silicon in which silicon is bivalent. In recent years, experimental evidence taken via various methods has confirmed that silicon(II) oxide does not exist as a distinct phase but as a mixture of Si and $SiO_2$. The interface for this mixing occurs over the scale of 3 to 4 nm. Therefore, as noted by Schnurre et al. in Thermodynamics and phase stability in the Si—O system. J. Non-Cryst. Solids 2004, 336, 1-24, "amorphous SiO is not a classical homogeneous single phase, yet because of this small domain size it is also not a classical heterogeneous two-phase mixture". It is referred to by many as a random-mixture (RM) model, speculating that over certain small domains, silicon is bonded to only silicon or only oxygen, corresponding to an intimate, two-phase mixture of Si and $SiO_2$. This is confirmed by the $^{29}Si$ MAS-NMR spectra of SiO showing two different resonances whose chemical shift values are close to those of elemental state Si and $SiO_2$, suggesting that the RM model is the more appropriate description for SiO microstructure.

$SiO_x$ material is a potential parent material for Si-based anode material owing to the irreversible generation of $Li_2O/Li_4SiO_4$ and Si during the first lithiation process. The in-situ formed Si during the first lithiation process should be nano-sized and dispersed uniformly in the simultaneously formed $Li_2O/Li_4SiO_4$ matrix. The latter as inactive component can prevent the active Si cluster from aggregation, and thus improve the cycling stability of Si-based materials.

Commercial $SiO_x$ powder is usually prepared by (1) heating a mixture containing silicon and silicon dioxide in an inert gas atmosphere or in vacuum at a high temperature to generate SiO gas, and feeding oxygen gas to the SiO gas to form a gas mixture, and depositing the gas mixture on a surface of a cooled substrate, where the x value is usually more than 1 (see for example US2010/009261A1); (2) mixing and depositing a gas mixture of SiO and Si gases on a substrate, the starting material to generate SiO gas being a mixture of a silicon oxide powder or a silicon dioxide powder with a metal silicon powder, where the x value is usually less than 1 (see for example US2007/0254102A1). The preparation methods of $SiO_x$ by simultaneously generating silicon and silicon oxide vapours suffers from the high working temperature (more than 2000° C.) due to the low vapour pressure of silicon and silicon oxide, which results in high cost and low yields.

With respect to the preparation method of composites of $SiO_x$/graphite, $SiO_x$/carbon, and $SiO_x$/graphite/carbon, commercial $SiO_x$ powder is commonly used to ball mill with graphite to form $SiO_x$/graphite composite anode materials, while disordered carbon can be formed on the surface of $SiO_x$ particles by CVD, sol-gel, hydrothermal methods, etc., followed by a heat treatment.

An object of the invention is to provide an optimized negative electrode material comprising $SiO_x$ and carbon and a method for preparing the negative electrode material $SiO_x/C$ for use in LIBs, with simple and flexible synthesis conditions. A further object is to provide a negative electrode material, which exhibits high specific capacity and good cycling stability. A yet further object of the present invention is to provide a negative electrode material characterised by an optimum lithium percolation.

SUMMARY

Viewed from a first aspect, the invention provides a negative electrode powder for a lithium-ion rechargeable battery comprising a mixture comprising carbon and $SiO_x$ with $0<x<1$, wherein the $SiO_x$ consists of a nanometric composite of crystalline $SiO_2$ and amorphous Si, wherein said mixture is homogeneous.

By a negative electrode powder is herein understood a powder suitable for use as an active material in the manufacturing of said electrode. By a powder comprising a mixture is herein understood that said powder comprises particles, which in turn comprise said mixture. The $SiO_x$ composite used in accordance with the invention is preferably nanometric, i.e the individual particles of $SiO_x$ and/or carbon may have a size between 1 and 50 nm, more preferably between 1 and 30 nm, most preferably between 1 and 20 nm. In one embodiment $0.5<x<1$, and preferably $0.6<x<0.9$.

The powder of the invention may have a d50 value between 0.8 and 8 μm, preferably between 0.8 and 3 μm. The powder may have a BET value of less than 5 $m^2/g$, and preferably less than 1 $m^2/g$.

In an embodiment of the invention, the mixture of carbon and $SiO_x$ has a weight ratio $SiO_x:C$ between 33:1 and 1:1, preferably between 9:1 and 1.5:1. The weigh ratio is the ratio between the total weights of $SiO_x$ and carbon forming the powder of the invention.

The mixture may further comprise $M_yO$, wherein M is a metal with an oxidation number of x, with $x*y=2$, and wherein M is selected from the group consisting of Al, Ca, Mg, Ti, Li and combinations thereof.

The mixture of the invention is homogeneous, i.e. the mixture is free of large domains of $SiO_x$ and carbon; for example large domains of $SiO_x$ and carbon occur in an e.g. core-shell structure wherein the core is a large domain consisting of the $SiO_x$ and the shell is a large domain consisting of carbon.

Preferably no $SiO_x$ domains larger than 100 nm, more preferably larger than 50 nm, most preferably larger than 20 nm can be distinguished with a scanning electron microscope (SEM) or a high-resolution transmission electron microscope (HR-TEM). The size of a $SiO_x$ domain is herein considered the largest dimension thereof. By a $SiO_x$ domain is hereinafter understood a domain or region of the active material which is free of carbon. Preferably, the mixture of the invention consists of said $SiO_x$ and said carbon. It was observed that such a homogeneous mixture showed an optimum lithium percolation and conductivity.

According to the invention, the $SiO_x$ comprises a nanometric composite of (Si) and silicon dioxide ($SiO_2$). Nanometric composites (also referred to or known in the art as intimate mixtures) are composites where the mixing of Si and $SiO_2$ occurs over a nanometric scale, e.g. over the scale of from 1 to 5 nm, more preferably from 3 to 4 nm. In other words, it is preferred that the $SiO_x$ used in accordance with the invention contains domains consisting of metallic Si having dimensions of between 1 nm and 5 nm, more preferably between 3 nm and 5 nm.

In accordance with the invention, the Si contained by said $SiO_x$ is amorphous and the $SiO_2$ contained by said $SiO_x$ is crystalline. Preferably, the amounts of amorphous Si and crystalline $SiO_2$ present in said $SiO_x$ are chosen such that $0.3 \leq x \leq 1.5$, more preferably $0.5 \leq x < 1.5$.

Viewed from a second aspect, the invention provides a process for preparing the negative electrode active material of the invention, comprising the steps of:
providing an aqueous solution comprising an anti-agglomeration agent,
dispersing a silicon comprising organic compound in the aqueous solution,
hydrothermally treating the aqueous solution at a temperature between 90 and 180° C. for a period of 0.5 to 24 h, preferably between 110 and 140° C. for a period of 0.5 to 4 h, thereby forming a suspension of $SiO_2$ and Si in the aqueous solution,
evaporating the solution, thereby obtaining a slurry,
subjecting the slurry to a coking process whereby a solid residue is formed, and
calcining the solid residue at a temperature between 500 and 1300° C., preferably between 600 and 1000° C., in a non-oxidizing atmosphere.

In one embodiment, the process comprises the steps of:
providing a first aqueous solution comprising an anti-agglomeration agent,
dissolving an organic carbon source in a second solution,
dispersing a silicon comprising organic compound in the first aqueous solution,
hydrothermally treating the first aqueous solution at a temperature between 90 and 180° C. for a period of 0.5 to 24 h, preferably between 110 and 140° C. for a period of 0.5 to 4 h, thereby forming a suspension of $SiO_2$ and Si in the first aqueous solution,
mixing the first aqueous solution and the second solution, thereby obtaining a third solution,
evaporating the third solution at a temperature below the boiling point of the second solution, thereby obtaining a slurry,
subjecting the slurry to a coking process whereby the organic carbon source is decomposed and a solid residue is formed, and
calcining the solid residue at a temperature between 500 and 1300° C., preferably between 600 and 1000° C., in a non-oxidizing atmosphere.

In an embodiment, the second solution is a second aqueous solution, and the content of the organic carbon source in the second solution is between 100 and 300 g/l. In another embodiment, the quantities of the organic carbon source and the silicon comprising organic compound are provided so as to obtain a weight ratio $SiO_x:C$ between 33:1 and 1:1, preferably between 9:1 and 1.5:1 in the mixture of carbon and $SiO_x$.

In still another embodiment, the organic carbon source is sucrose and the coking process of the slurry is performed at a temperature between 150 and 350° C., preferably between 200 and 300° C. during 1 to 10 h. Or, the organic carbon source is epoxy resin and the coking process of the slurry is performed at a temperature between 250 and 450 ° C., preferably between 300 and 400° C. during 1 to 10 h.

In still another embodiment, the silicon comprising organic compound is an alkyl ester of orthosilicic acid, preferably tetraethyl- or tetramethyl-orthosilicate.

In both process embodiments, the content of the anti-agglomeration agent in the (first) aqueous solution may be between 5 and 10 g/l. The anti-agglomeration agent may comprise carbon. The anti-agglomeration agent is in an embodiment either polyvinyl pyrrolidone or a vinyl pyrrolidone-vinyl ester copolymer. The calcination of the solid residue may be performed in a reducing atmosphere comprising $H_2$ or $CH_4$.

As mentioned in the discussion of the prior art, the $SiO_x$ powders are up to now mainly prepared by simultaneously generating silicon and silicon oxide vapors, which method suffers from the high working temperature (more than 2000° C.) due to the low vapour pressure of silicon and silicon oxide and thereby high fabrication cost. The inventors made efforts to search for a simple and flexible method to produce nano-sized $SiO_x$ and $SiO_x/C$ negative electrode material for lithium ion batteries. The nano-sized $SiO_x/C$ may consist of a mixture at nanometric scale of C, Si and $SiO_2$ and in one embodiment, the intimate mixture consists of an intimate mixture of amorphous carbon, amorphous silicon and crystalline silica at the scale of 1 to 20 nm. The inventors found that nano-sized silicon oxide ($SiO_x$) colloidal particles can for example be formed in a solution of a (alkoxy-) silane compound under hydrothermal condition. The temperature is low (it can be less than 150° C.) and the $SiO_x$ powders are formed from an aqueous solution, which is simple and environmentally friendly. The size of $SiO_x$ can be controlled by adjusting the hydrothermal temperature, the free volume in the reactor (which influences the pressure) and the concentration of silane compound in the solution. Coating the obtained $SiO_x$ with carbon via a sol-gel method or CVD route can enhance the lithium storage ability of the $SiO_x$ negative electrode material. The specific capacity of $SiO_x/C$ can be tailored by changing the carbon content in $SiO_x/C$ composite powders.

Viewed from a third aspect, the invention can provide a use of the negative electrode powder of the invention in a negative electrode of a Lithium-ion battery. The invention also relates to a negative electrode comprising 50 to 95 wt % of the negative electrode powder of the invention, 2.5 to 25 wt % of a conductive agent and 5 to 25 wt % of a binder material. The wt % are calculated with reference to the sum of the masses of the three enumerated components. A negative electrode material comprising the powders of the invention as active material may be used to construct a lithium ion battery having high capacity and improved cycle performance.

DETAILED DESCRIPTION

Figure 1A:
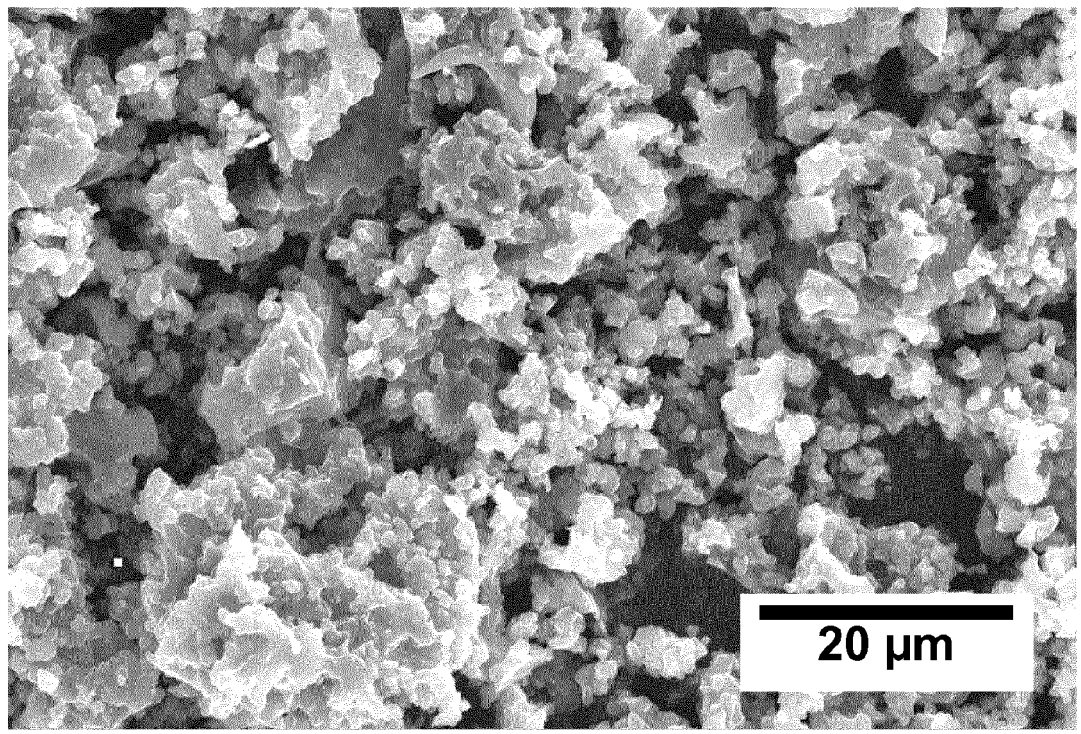
FIG. 1: (a) SEM image of $SiO_x/C$ material from Example 1; and (b): Power rate (delivred capacity [C] vs current [A]) of electrode (example 1) and comparison with power rate (calculated) of Jing Wang et al.

Description of an embodiment of the method of the invention:

[1] In the method for producing $SiO_x/C$ of the present invention, silicon containing organics are used as starting material for producing nano-sized $SiO_x$ particles in hydrothermal conditions. Examples for such silicon containing organics include alkyl esters of orthosilicic acid, such as tetraethylorthosilicate (TEOS or tetraethoxysilane $Si(OC_2H_5)_4$), TMOS ($Si(OCH_3)_4$.and among these, use of TEOS is preferable in view of the low toxicity and cost. The organics provide a source of carbon for producing the $SiO_x/C$ compound.

[2] The TEOS is dispersed into water containing a certain amount of a known agglomeration inhibitor, preferably a carbon-containing compound, such as polyvinylpyrrolidone (PVP), to generate $SiO_x$ powders via a hydrothermal route. The content of TEOS in water may be in the range of 50-60 g/L of water, preferably 50-55 g/L. High contents of TEOS in water easily result in large particle size, while low contents of TEOS will cause small yields of $SiO_x$ powder after hydrothermal treatment. PVP is added in the range of 5-10 g/L of water, to suppress the growth of agglomerates of $SiO_x$. Anti-agglomeration agents are known in the art, from e.g. U.S. Pat. No. 5,204,024, disclosing, besides PVP, vinyl pyrrolidone-vinyl ester copolymers. They can be represented as:

polyvinyl pyrrolidone:

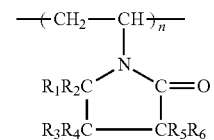

vinyl pyrrolidone-vinyl ester copolymer:

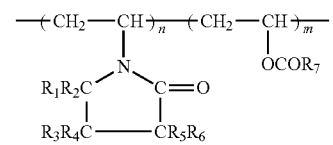

with, for both, n and m are integers of at least 1, and each of $R_1$ to $R_6$ is H or a $C_{1-4}$ alkyl group. $R_7$ is a $C_{1-2}$ alkyl group.

[3] The aqueous solution containing silicon source and PVP is transferred into an autoclave, which is put into an oven or muffle furnace for hydrothermal treatment (putting the aqueous solution at a high temperature under a high vapor pressure). The solution takes ½-¾ volume of the autoclave container, preferably ½-⅔. When the volume of the autoclave container is less than ½, the yield of the $SiO_x$ is lowered.

[4] The solution in the autoclave is hydrothermally treated at a temperature in the range of 100 to 180° C. for 0.5-10 h, and preferably 110-140° C. for 0.5-4 h, to thereby generate a $SiO_x$ suspension. The reaction is e.g. for TEOS: $Si(OC_2H_5)_4 + 2H_2O \rightarrow SiO_2 + 4C_2H_5OH$. A small portion of Si is also generated, thereby creating the reaction product $SiO_x$ with x just below 2. Low hydrothermal temperature and short time easily result in $SiO_x$ particles with non-uniform sizes. Excessively high temperature will cause large particle size, which is unfavourable for the electrochemical properties of $SiO_x/C$ composite. This variation of temperature influences the pressure inside the autoclave and this pressure can be approximated according to the basic knowledge of phase diagram. This means that if the temperature of autoclave is set, the pressure in the autoclave is determined.

[5] In some embodiments, in order to increase and accurately control the carbon content, a carbon source is dissolved into a solution, which is then added into the hydrothermally treated $SiO_x$ suspension under strong stirring. The carbon source can be any known carbon source in the field of negative electrodes, for example a hydrocarbon compound, such as sugar, glucose, pitch and various resins. The solvent to dissolve the carbon source may be water, ethanol and methanol. The addition amount of the carbon source is equivalent to 3-50 wt % carbon in $SiO_x/C$ composite, preferably 10-40 wt %. Lower carbon content may cause poor electronic conduction and therefore affect the specific capacity of the invented $SiO_x/C$ active material, especially at high charge/discharge current density. Carbon content higher than 50 wt % may result in lower specific capacity of the invented $SiO_x/C$ active material due to the low specific capacity of the carbon component.

[6] The mixed solution containing $SiO_x$ and—if present—the additional carbon source, is heated under agitation or rotary condition with the aim of removing the solvent from the mixed solution. With respect to the heating process, vacuum environment and low temperature condition are preferred. The heating temperature should be lower than the boiling point of the solvent of the carbon source, for example for water as solvent lower than 100° C., and preferably 80-95° C. In case no carbon source is added the heating temperature should be lower than 100° C. (for the aqueous suspension). Higher heating temperature easily leads to the inhomogeneous structure of $SiO_x/C$ composite. The rotary and vacuum reflux condition is preferable, especially the rotary evaporator is recommended.

[7] The obtained viscous slurry is put into a ceramic crucible and coked in an oven. The aim of coking or pyrolysis is to decompose the organic carbon source and cause the product to solidify. The coking temperature depends strongly on the species of carbon present. As an example, when sucrose is used as carbon source, the coking temperature is in the range of 150-350° C., preferably 200-300° C. If the coking temperature is less than 150° C., the viscous slurry is difficult to be solidified. When the coking temperature is higher than 350° C., the slurry may severely decompose and lead to the product spurting out. When epoxy resin is used as carbon source, the coking temperature is in the range of 250-450° C., preferably 300-400° C. By the knowledge of the DSC (diferential scanning calorimetry) pyrolysis curves of the organic carbon source and its behaviour during pyrolysis the appropriate coking temperature can be selected for each carbon source.

[8] After coking treatment, the product is put into a ceramic crucible and heated in a furnace under an inert or reducing atmosphere at a temperature of 400-1300° C., and preferably 600-1000° C., to produce $SiO_x/C$ material. When the calcination temperature is lower than 400° C., the carbonization of the $SiO_x/C$ material can not be completed; some organic groups may remain. Heating to a temperature in excess of 1300° C. may result in the $SiO_x$ with higher crystallinity, which will lead to a poor electrochemical activity. During this process, carbon reacts with $SiO_2$ to form Si, and the carbon amount is selected to yield a final $SiO_x$ product with x<1. This reaction is probably due to the particular surface state of $SiO_2$/Si particles after the hydrothermal treatment. A nano-effect decreases the temperature of reduction of $SiO_2$ by the carbon.

[9] The value of x in the $SiO_x/C$ of the present invention is x<1, and this value can be controlled by adjusting the composition of the surrounding atmosphere. The value of x in the $SiO_x/C$ materials prepared in inert atmosphere is higher than that prepared in a reducing atmosphere, such as $H_2$, $CH_4$ containing atmosphere. An oxygen-free atmosphere is beneficial for the preparation of $SiO_x/C$ with lower x value.

The invention is further illustrated in the following examples:

Methods of Measurement

To measure the oxygen content of a sample, the specimen was ground to a granulometry of 0.25 mm, then sifted at 0.05 mm so as to retain only the 0.25-0.05 mm fraction. In fact, at the time of the preparation procedure, the fraction measuring less than 0.05 mm underwent additional oxidation, which could not be taken into consideration. A 250-mg test sample was collected from the 0.25-0.05 mm fraction, then packaged in a tin sheet in order to be placed in a graphite crucible of a LECO device at a temperature of 3,000° C. at which the sample was transformed into CO. The CO was subsequently oxidized so as to form $CO_2$, which was then analyzed. The final result was calculated based on the average obtained from five operations. To obtain the surface oxygen content, the same treatments were carried out on powders comprising a $SiO_x$ layer. Since the oxygen content within the mass of the product was virtually nil, the total concentration as measured corresponded to the surface content.

BET was determined in accordance with he theory developed by Brunauer, S., Emmett, P. H., and Teller, E., *J. Am. Chem. Soc.* 60: 309-319 (1938).was used.

The boiling point of a liquid phase is listed in the *Handbook of Chemistry and Physics*, ed. 2008-2009, at chapters 3, 4, 6, 12 and 15 (for detailed info the index at I-2, B can be used).

The specific density of the Si-based material contained by the Si-based particles was considered 2.3 g/m³, regardless of its composition, i.e whether the Si-based particles further contained dopants, oxides or alloyed materials.

Unless otherwise indicated, by size of a particle is herein understood the average diameter thereof which was determined by SEM imagery by measuring the largest measurable distance between two points on the periphery of the particle, respectively. To obtain reliable data, SEM micrographs were taken with a 1000× magnification and at least 100 particles are measured on each SEM micrograph to determine objects having a diameter of at least 0.5 µm. The same procedure was repeated for the determination of objects having a diameter of below 0.5 µm, however the SEM micrographs were taken with a higher magnification (preferably above 50.000×). The sample may be prepared for SEM according to well known methodologies, e.g. by embedding it in resin followed by cutting and polishing to provide a smooth cross-section thereof. To aid in the counting and diameter measurement of a large number of particles, an image analysis software may be used, e.g. Image-Pro Plus from Media Cybernetics.

The average particle size for input powders was determined on suspensions thereof by light-scattering method using commercially available equipment. The person skilled in the art will be familiar with this method, and in this context reference is also made to the disclosures given in JP 2002-151082 and WO 02/083555, which are hereby incorporated by reference. A Malvern 2000 equipment from Malvern Instruments GmbH, Herrenberg, Del., was used. The following measurement conditions were selected: compressed range; active beam length 2.4 mm; measurement range: 300 RF; 0.01 to 900 μm. The specimen preparation and measurement were carried out in accordance with the manufacturer's instructions.

The thickness of a layer, e.g. of carbon, can be determined by High Resolution TEM (HR-TEM). Typical sample preparation included dispersing the sample in a suitable liquid followed by placing a suitable amount of the liquid dispersion on a standard TEM grid and allowing for the liquid to evaporate.

The crystallinity or amorphicity of a sample can be determined by HR-TEM, electron diffraction (ED) and electron energy loss spectroscopy (EELS) mapping. The HR-TEM was used to identify domains with different composition, EELS was used to identify which domains contain $SiO_2$ (the remaining domains being those containing Si) and ED was used to determine crystallinity.

The dimension of a Si (or $SiO_x$) domain as identified with the above mentioned HR-TEM/EELS/ED techniques can be determined from HR-TEM pictographs by measuring the largest distance between two points on the periphery of said domain.

The particle size distribution (d50) was measured in accordance with the methodology disclosed in U.S. Pat. No. 7,807,121.

Example 1

$SiO_x$/C Powder According to the Invention; (1a) & (1b)

(1a) At room temperature, 7.44 ml TEOS (tetraethylorthosilicate), used as Si source, is dissolved in 125 ml water, wherein 1 g polyvinylpyrrolidone (PVP) is added. The PVP plays two roles in the synthesis of nano-sized SiOx. The first role is to help the dissolution of TEOS into water. Because TEOS can not be directly dissolved in water and PVP is an amphipathic molecule with organic groups and inorganic group, it can bring TEOS into water and promote the hydrolysis of TEOS into Si(OH)x particles. The second role is to prevent the agglomeration of nano-sized SiOx by hydrogen-bonding the silanol groups (Si—OH), as illustrated by the following scheme:

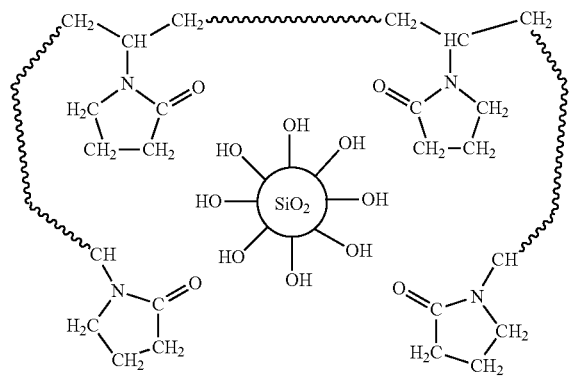

The solution is transferred to a 200 ml autoclave and hydrothermally treated at 130° C. for 1 h. At this stage the powder is a $SiO_x$ with x near to 2 with appears amorphous in XRD but which is composed of nano-domains of crystallized $SiO_2$ (confirmed by TEM observations).

Figure 2:
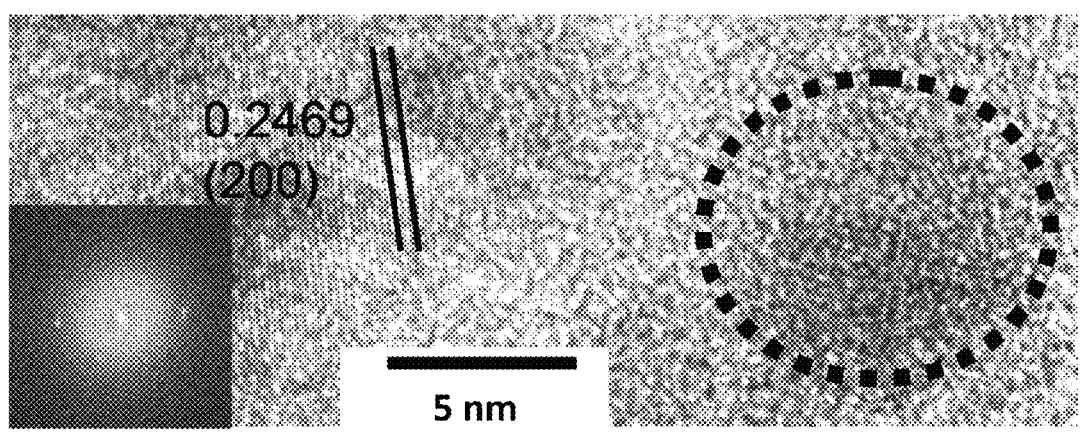
FIG. 2: TEM and HR-TEM images of $SiO_x/C$ material from Example 1.

After cooling down to room temperature, the solution inside the autoclave is transferred into a flask, and then a sucrose solution (3.287 g sucrose in 15 ml water) is introduced into it under stirring. The mixed solution is dried at 90° C. in a rotary evaporator under reflux condition. The obtained viscous slurry is coked at 250° C. for 10 h in an oven and then calcined at 800° C. for 1 h in 5% $H_2$/Ar atmosphere to produce $SiO_x$/C composite powders. The powder is composed of many near-spherical particles with a size ca. 1 μm and a certain amount of aggregated large particles, as depicted in FIG. 1(a). This $SiO_x$/C powder exhibits amorphous state from XRD result but TEM observation (FIG. 2) reveals that the $SiO_x$ particles are actually composed of two distinct parts, well-ordered parts and disordered parts. In the ordered part, lattice fringes can be observed, and the lattice spacing agrees with $SiO_2$ (200) plane spacing. The amorphous part (indicated in the picture with dot line) is amorphous silicon. The intimate mixture of crystallized part and amorphous part can be also visualized with the electron diffraction (ED) which shows a none defined signal with some dots which can be indexed and are in correlation with $SiO_2$ crystal. To differentiate the amorphous carbon from the amorphous silicon, ED was used. The oxygen content in the obtained $SiO_x$/C powder is 17 wt %. Silicon content is 37wt % and the carbon content is measured at 45 wt %. So we have $SiO_x$/C with x=0.8.

Figure 1B:
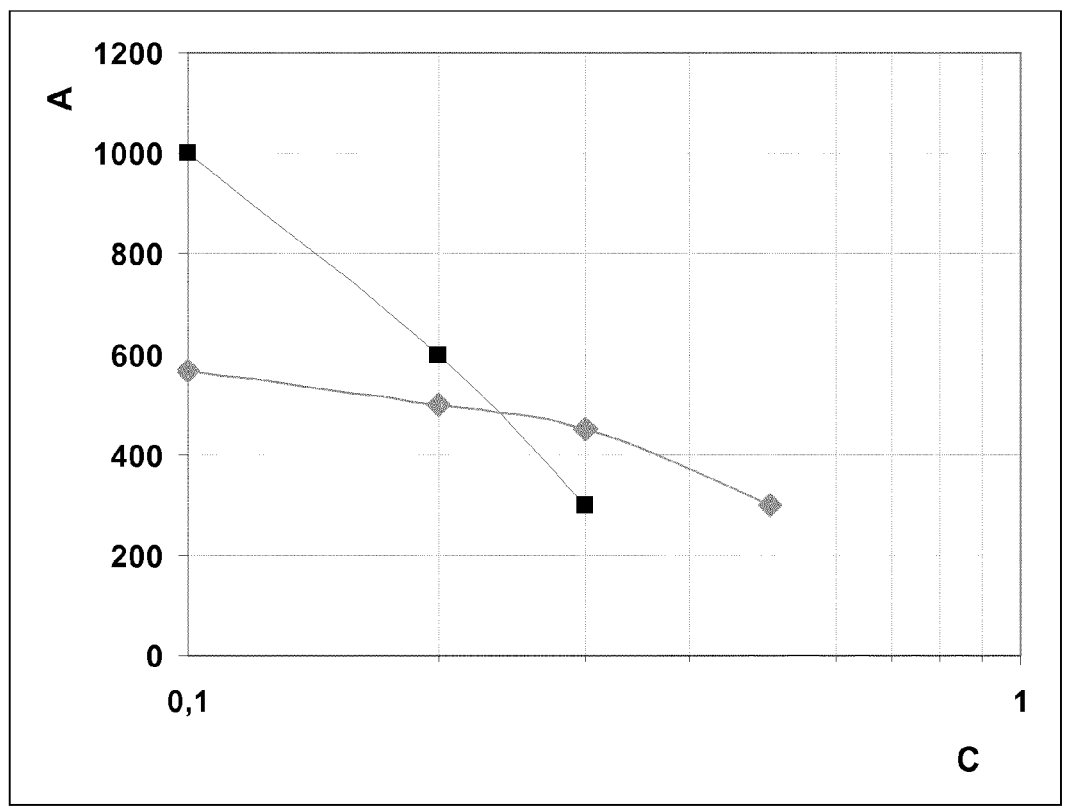
Figure 3:
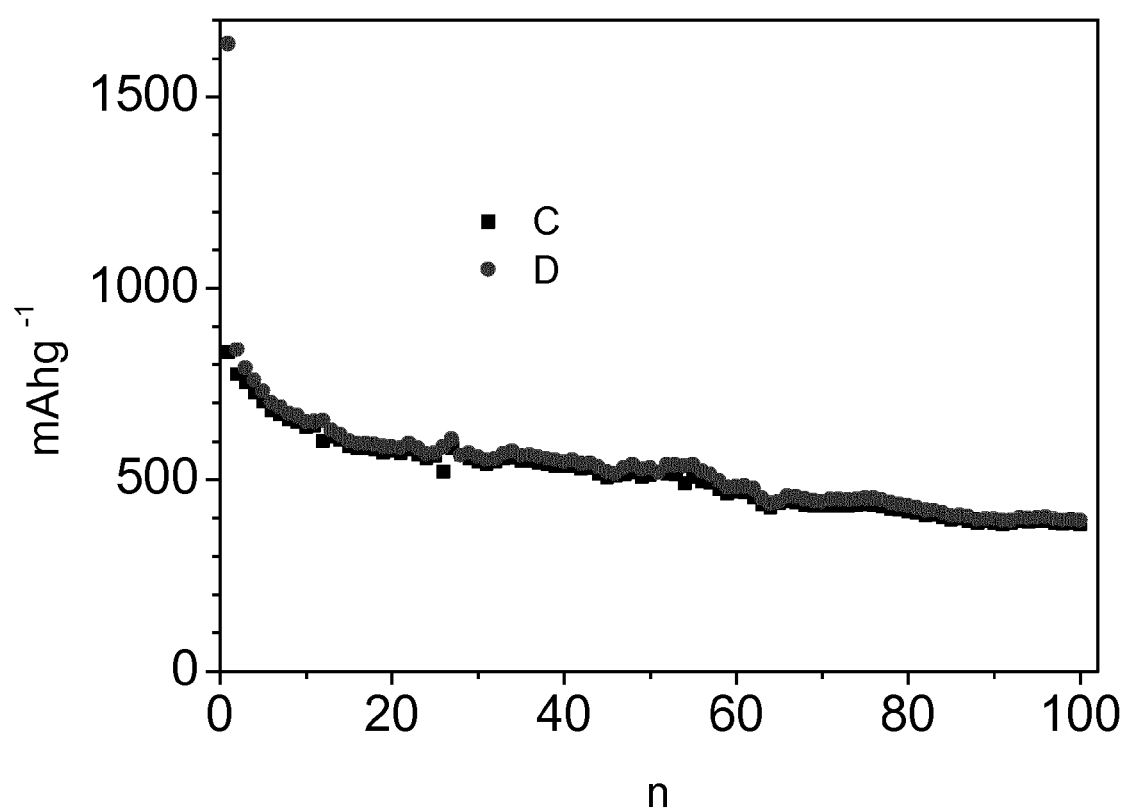
FIG. 3: Lithiation (D)—delithiation (C) capacity (in mAh/g of active material) of a battery using powder from Example 1 at a current of 100 $mAg^{-1}$.

The prepared $SiO_x$/C powder is evaluated as negative electrode material in the following cell test. Electrodes containing 70 wt % $SiO_x$/C powder (active material), 15 wt % acetylene black (conductive agent), and 15 wt % polyvinylidene fluoride (PVDF, binder) are made by coating the slurry of the electrode ingredients in N-Methyl-2-pyrrolidone (NMP) onto copper foil, which is dried at 120° C. in a vacuum oven for 24 h. The copper foil with electrode materials are then punched into circular discs with a diameter of 8 mm and vacuum dried overnight. The working electrodes are assembled in Swagelok cells using Celgard 2400 as the separator and lithium foil as counter electrode. The electrolyte consists of 1M $LiPF_6$ in a non-aqueous solution of ethylene carbonate (EC), ethyl methyl carbonate (EMC) and dimethyl carbonate (DMC) (1:1:1 by volume). The cell is assembled in an Ar-filled glove box with oxygen and water contents less than 1 ppm. Galvanostatic cycling test with metallic lithium as counter electrode is conducted on a battery test system in a voltage range of 0.01-2.5 V vs. $Li/Li^+$ at a current density of 100 $mAg^{-1}$. When compared with the material of Jing Wang et al., it was observed that the material of Example 1 shows improved power rates. This can be clearly seen in FIG. 1(b). The cell marked an initial (1st cycle) discharge capacity (delithiation) of 810 mAh/g, and 400 mAh/g after 100 cycles (see FIG. 3).

(1b) In this example, a slurry is prepared using 50 wt % of the powder from Example 1, 25 wt % of a Na-CMC binder (Molecular weight <200 000) and 25 wt % of a conductive additive (Super C65, commercial product from Timcal). In a first step, a 2.4% Na-CMC solution is prepared and dissolved overnight. Then, the conductive carbon is added to this solution and stirred for 20 minutes using a high-shear mixer. Once a good dispersion of the conductive carbon is obtained, the active material is added and the slurry is stirred again using a high-shear mixer during 30 minutes.

Figure 4:
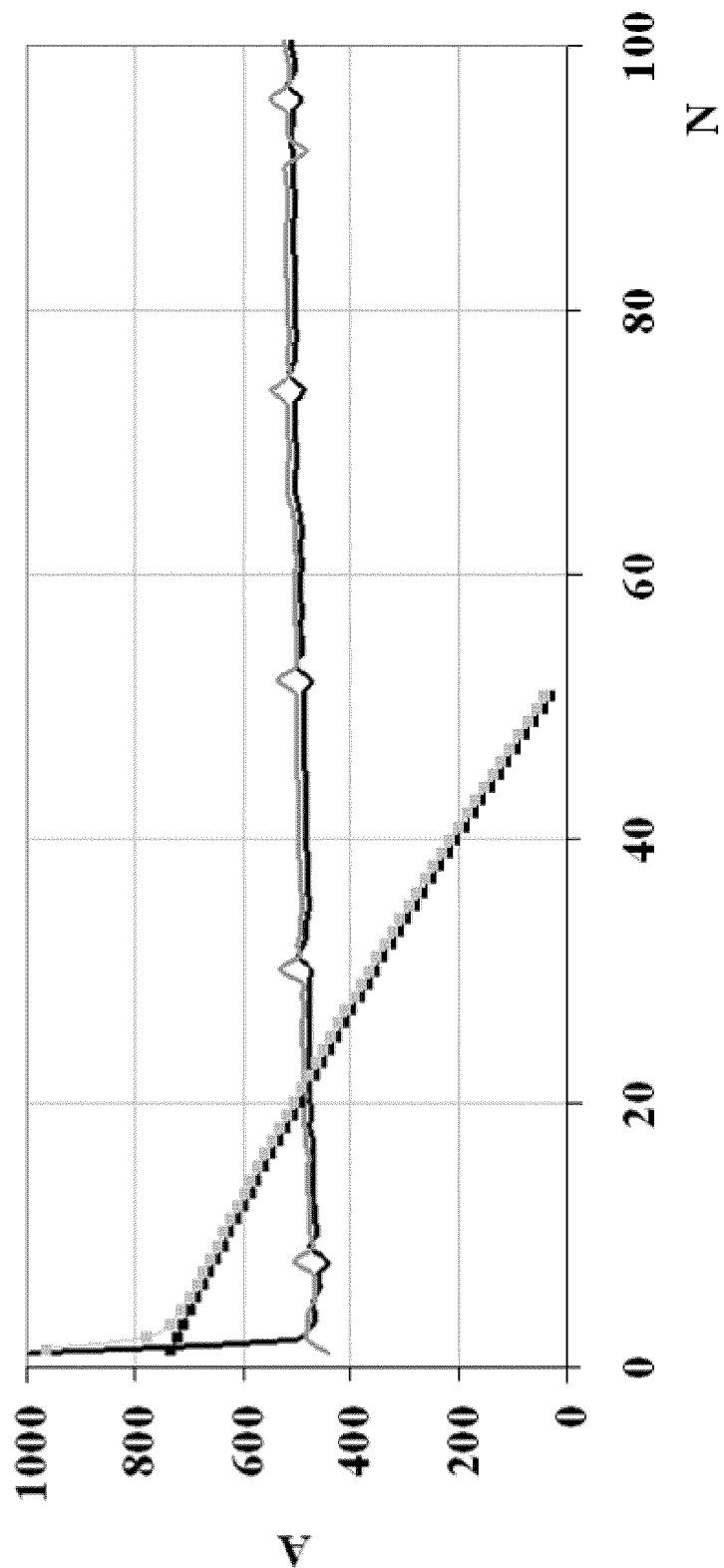
FIG. 4: Lithiation (starting from top)—delithiation (starting from below) capacity (in mAh/g of active material) versus cycle number, of a battery using powder and electrode formulation from Example 1b. Results from Jing Wang et al. are also included.

The electrodes are prepared by coating the resulting slurry on a copper foil (thickness: 17 μm) with a slurry layer thickness of 125 μm and then dried at 70° C. for 2 hours. Round electrodes are punched and dried at 150° C. during 3 hours in a small vacuum oven. The electrodes are electrochemically tested versus metallic lithium in coin cells prepared in a glovebox under dry argon atmosphere. The electrolyte used is 1M $LiPF_6$ in a mix of ethylene carbone (EC)/diethylcarbonate (DEC) (50/50 wt %)+10% fluoroethylecarbonate (FEC)+2% vynilene carbonate (VC) (commercial product of Semichem). The coin cells are tested in a continuous current (CC) mode between 10 mV and 1.5 V at a rate of C/5 (meaning a full charge or discharge of 1000 mAh/g of active material in 5 hours). Every 20 cycles, a charge and a discharge are made at C/10 in order to measure the impact of the C-rate on the behavior. The result is shown in FIG. 4, showing the capacity retention in mAh/g versus cycle number N. The cell marked an initial (1st cycle) discharge capacity (delithiation) of 1000 mAh/g, and 510 mAh/g after 100 cycles.

Example 2

Similar to Example 1 with a Lower Temperature of Hydrothermal Treatment

Figure 5:
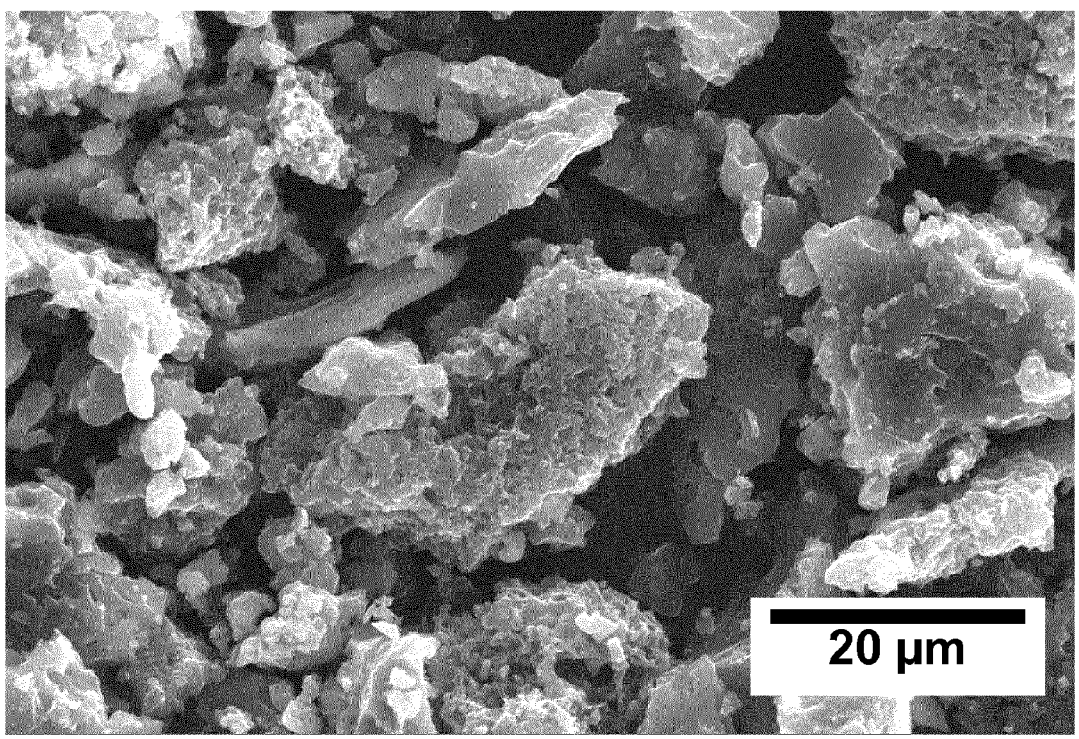
FIG. 5: SEM image of $SiO_x/C$ material from Example 2.

At room temperature, 7.44 ml TEOS (tetraethylorthosilicate), used as Si source, is dissolved in 125 ml water, wherein 1 g polyvinylpyrrolidone (PVP) is added. The solution is transferred to a 200 ml autoclave and hydrothermally treated at 90° C. for 1 h. After cooling down to room temperature, the solution inside the autoclave is transferred into a flask, and then a sucrose solution (3.287 g sucrose in 15 ml water) is introduced into it under stirring. The mixed solution is dried at 90° C. in a rotary evaporator under reflux condition. The obtained viscous slurry is coked at 250° C. for 10 h in an oven and then calcined at 800° C. for 1 h in pure $N_2$ atmosphere to produce $SiO_x/C$ composite powders. The SEM picture of this product is showed in the FIG. 5. We can clearly see that the reduction of the temperature implies an increase of the particle size and the agglomerates size. This is probably a direct effect of the decrease of pressure in the autoclave. The x value of SiOx is similar as in the previous Example.

Figure 6:
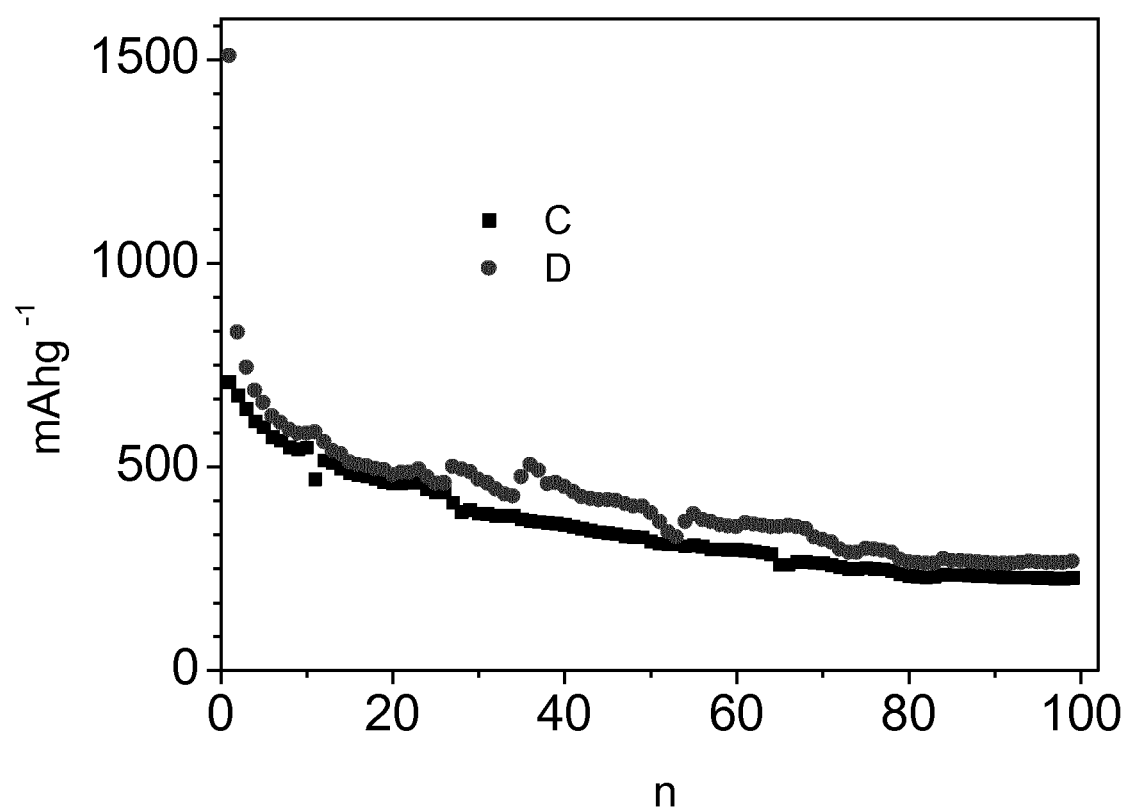
FIG. 6 Lithiation (D)—delithiation (C) capacity (in mAh/g of active material) of a battery using powder from Example 2 at 100 $mAg^{-1}$

As in Example 1, the prepared $SiO_x/C$ composite powder is used as active material for negative electrode in lithium ion half-cell. The negative electrode is prepared and evaluated by a cell test. The cell marked an initial lithiation capacity of 1508 mAh/g, an initial delithiation capacity of 750 mAh/g, a $50^{th}$ cycle discharge capacity of 403 mAh/g, and a capacity retention of 23% after 100 cycles, indicating a lower electrochemical cyclability than the Example 1 (see FIG. 6). The fact that the initial capacity of the electrode is similar as the Example 1 confirms the similar value of x in $SiO_x$. But the increase of the particles size has a direct consequence on the capacity retention of the electrode.

Example 3

Use of a Different Carbon Source

Figure 7:
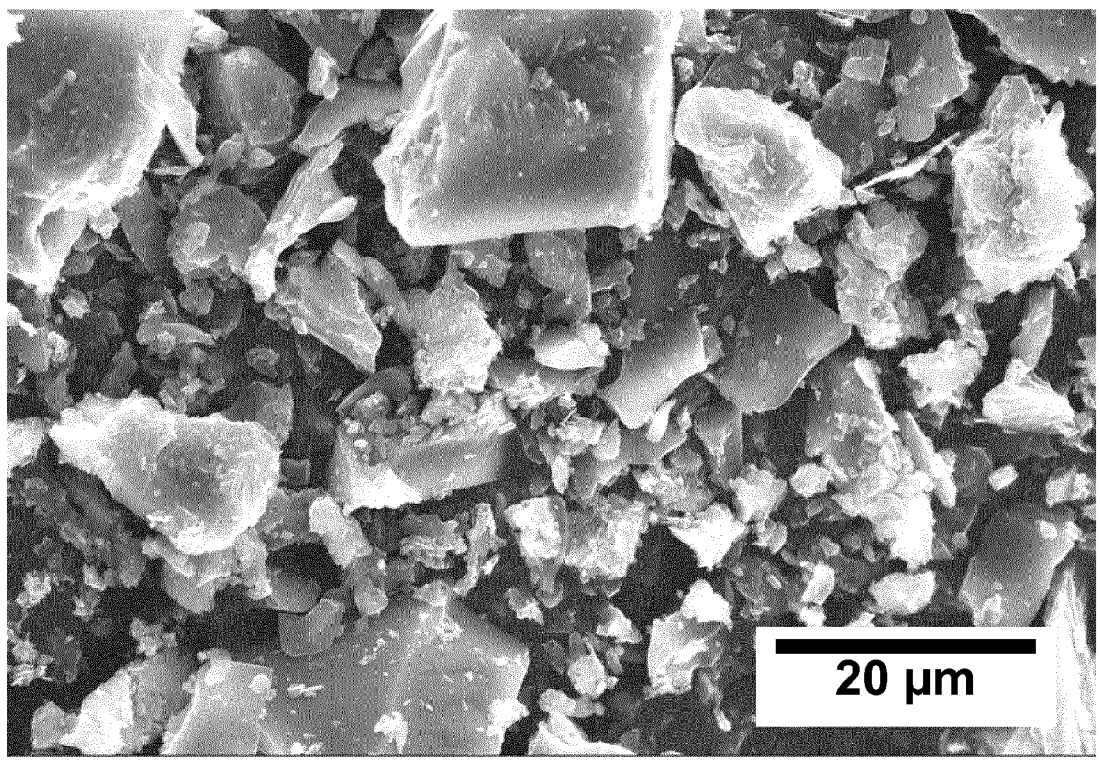
FIG. 7: SEM image of $SiO_x/C$ material from Example 3.

At room temperature, 7.44 ml TEOS (tetraethylorthosilicate), used as Si source, is dissolved in 125 ml water, wherein 1 g polyvinylpyrrolidone (PVP) is added. The solution is transferred to a 200 ml autoclave and hydrothermally treated at 130° C. for 1 h. After cooling down to room temperature, the solution inside the autoclave is transferred into a flask, and then a carbon source (12.25 g epoxy resin in 20 ml ethanol) is introduced into it under stirring. The mixed solution is dried at 90° C. in a rotary evaporator under reflux condition. The obtained viscous slurry is coked at 350° C. for 10 h in an oven and then calcined at 1000° C. for 1 h in pure $N_2$ atmosphere to produce $SiO_x/C$ composite powders. In contrast as the example 1, the powder is composed of large agglomerate particles with a size from 2 to 20 μm (see FIG. 7). This proves that the carbon source influences the final morphology of the material. The x in SiO was measured at lower than 1.

Figure 8:
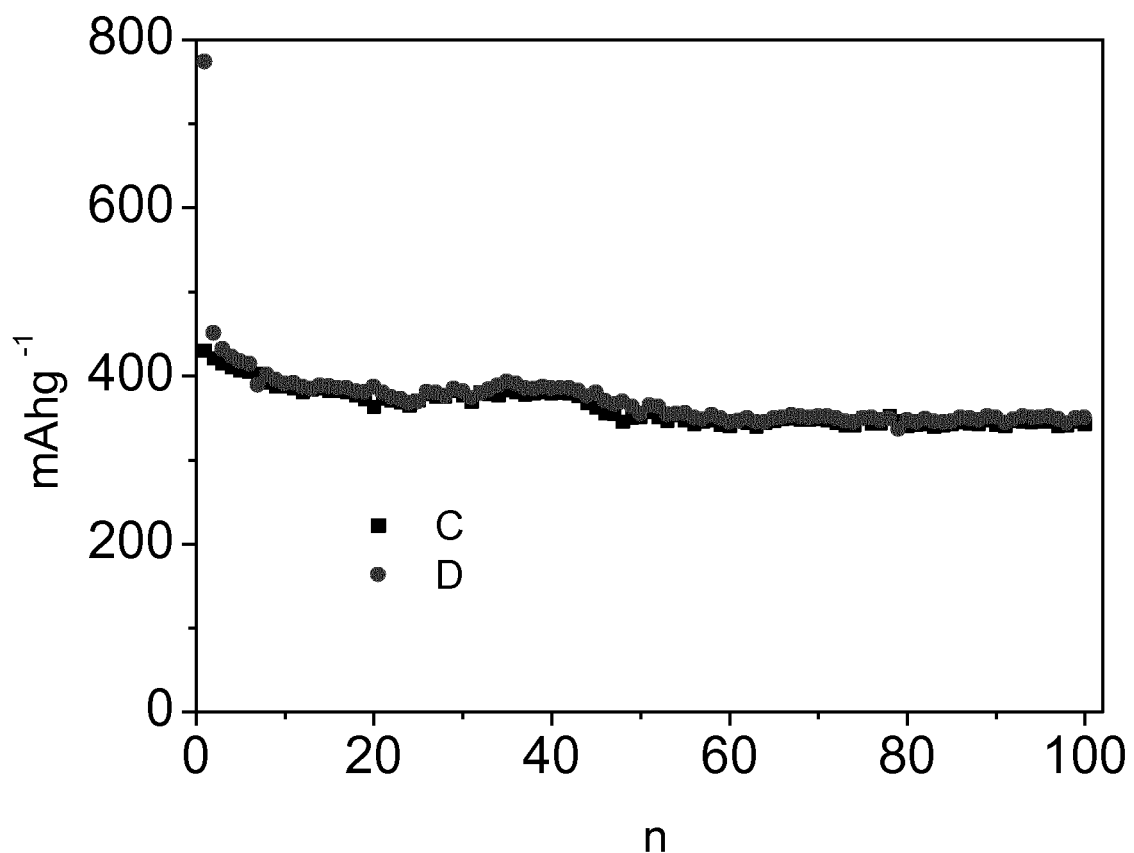
FIG. 8: Lithiation (D)—delithiation (C) capacity (in mAh/g of active material) of a battery using powder from Example 3 at 100 $mAg^{-1}$.

As in Example 1, the prepared $SiO_x/C$ composite powder is used as active material for negative electrode in a lithium ion half-cell. The negative electrode is prepared and evaluated by a cell test. The cell marked an initial lithiation capacity of 774 mAh/g, an initial delithiation capacity of 430 mAh/g, a $50^{th}$ cycle discharge capacity of 355 mAh/g, and a cycle retention of 81.4% after 100 cycles, indicating a low specific capacity but good cycling stability (see FIG. 8). The good capacity retention can be explained by the large agglomerate of particles and the lower capacity is explained by the inactivity of the carbon in the energy storage. It is indeed known that the carbon source influences the electrochemical activity of the final carbon based product.

Counter Example 4

Synthesis with Commercially Available $SiO_2$ Sol as Si Source

At room temperature, an amount of 6.96 ml $SiO_2$-solution (with 30 wt % $SiO_2$-produced by Beijing Red Star Guangsha Chemical Building Materials Co., Ltd (HX-30)), used as Si source, is introduced into a sucrose solution (3.287 g sucrose in 15 ml water) under stirring. The obtained solution is dried in a rotary evaporator and then coked at 250° C. for 10 h in an oven, followed by calcining at 800° C. for 1 h in 5% $H_2/Ar$ atmosphere to produce $SiO_x/C$ composite powders. The x in $SiO_x$ is measured at higher than 1.6. This proves that the $SiO_2/Si$ precursor preparation via the hydrothermal process is the key of the preparation.

As in Example 1, the prepared $SiO_x/C$ composite powder is used as active material for negative electrode in lithium ion half-cell. The negative electrode is prepared and evaluated by a cell test. The cell marked an initial lithiation capacity of 360 mAh/g, an initial delithiation capacity of 123 mAh/g, a $50^{th}$ cycle discharge capacity of 209 mAh/g, and a cycle retention of 72% after 50 cycles, indicating a low specific capacity. The specific capacity increases gradually with cycling, probably due to the inertness of the $SiO_x$ particles.

Example 5

High Temperature of Calcination

At room temperature, an amount of 7.44 ml TEOS (tetraethylorthosilicate), used as Si source, is dissolved in 125 ml water, wherein 1 g polyvinylpyrrolidone (PVP) is added. The solution is transferred to a 200 ml autoclave and hydrothermally treated at 130° C. for 1 h. After cooling down to room temperature, the solution inside the autoclave is transferred into a flask, and then a sucrose solution (3.287 g sucrose in 15 ml water) is introduced into it under stirring. The mixed solution is dried at 90° C. in a rotary evaporator under reflux condition. The obtained viscous slurry is coked at 250° C. for 10 h in an oven and then calcined at 1200° C. for 1 h in 5% $H_2$/Ar atmosphere to produce $SiO_x$/C composite powders.

Figure 9:
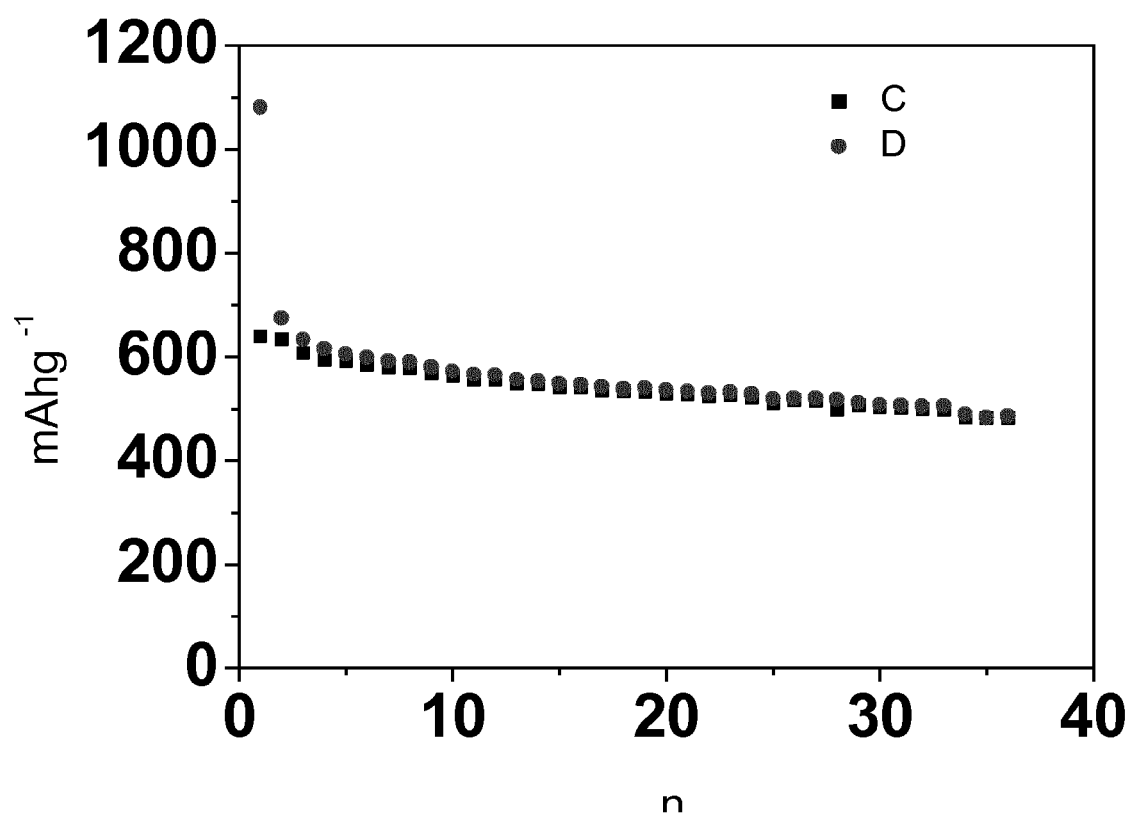
FIG. 9: Lithiation (D)—delithiation (C) capacity (in mAh/g of active material) of a battery using powder from Example 5 at 100 $mAg^{-1}$

As in Example 1, the prepared $SiO_x$/C composite powder is used as active material for negative electrode in lithium ion half-cell. The negative electrode is prepared and evaluated by a cell test. The sample delivered an initial lithiation capacity of 1080 mAh/g, an initial delithiation capacity of 640 mAh/g, and a charge capacity of 503 mAh/g after 30 cycles. (see FIG. 9)

Counter Example 5b

Low Temperature of Calcination

Figure 10:
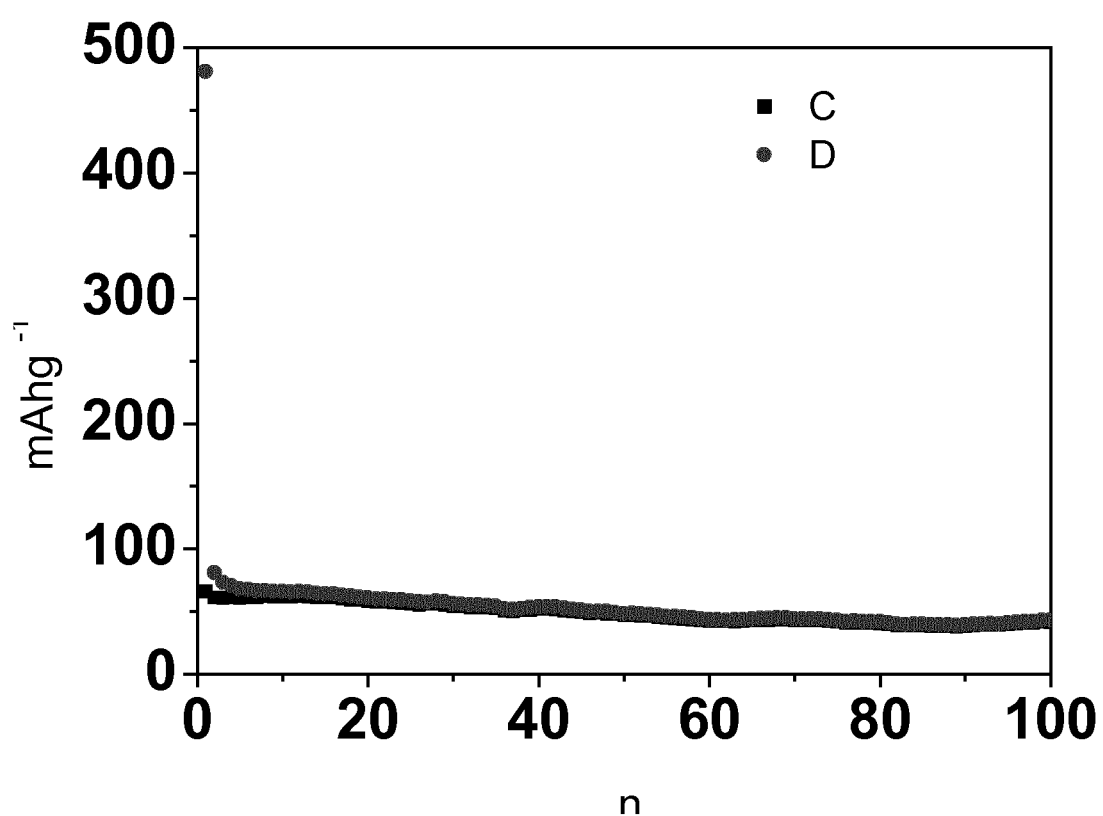
FIG. 10: Lithiation (D)—delithiation (C) capacity (in mAh/g of active material) of a battery using powder from CExample 5b at 100 $mAg^{-1}$

The sample is prepared and tested as in the Example 5. The main difference is that the calcination temperature is 400° C. in this case. This sample delivered an initial lithiation capacity of 480 mAh/g, an initial delithiation capacity of 70 mAh/g, and a charge capacity of 60 mAh/g after 30 cycles. (see FIG. 10)

This sample shows a lower specific capacity and an extremely low initial coulombic efficiency. This is because the $SiO_2$ nanoparticles could not be reduced effectively at a low temperature so as that the silicon oxide showed a poor activity toward lithium storage. This example proves that a transformation is made during the calcination step. A temperature lower than 500° C. is probably not enough to reduce the $SiO_2$ to Si. In parallel, the temperature does not seem to be enough to give electrochemical activity to the carbon.

Counter Example 6

$SiO_x$ Composite Powder Preparation (Without Carbon)

At room temperature, 7.44 ml TEOS (tetraethylorthosilicate), used as Si source, is dissolved in 125 ml water, wherein 1 g polyvinylpyrrolidone (PVP) is added. The solution is transferred to a 200 ml autoclave and hydrothermally treated at 130° C. for 1 h. After cooling down to room temperature, the solution inside the autoclave is transferred into a flask. The solution is dried at 90° C. in a rotary evaporator under reflux condition. The obtained viscous slurry is dried at 120° C. for 6 h in a vacuum oven to produce $SiO_x$ composite powders. The O content is 45 wt %, corresponding to $SiO_{1.63}$. This value of=1.63 indicates that the hydrothermal process creates a mixture of Si and $SiO_2$. But as no carbon is added and especially as no thermal treatment is performed, there is no reduction reaction of carbon to obtain a value of x<1. The BET is 0.28 $m^2$/g.

Figure 11:
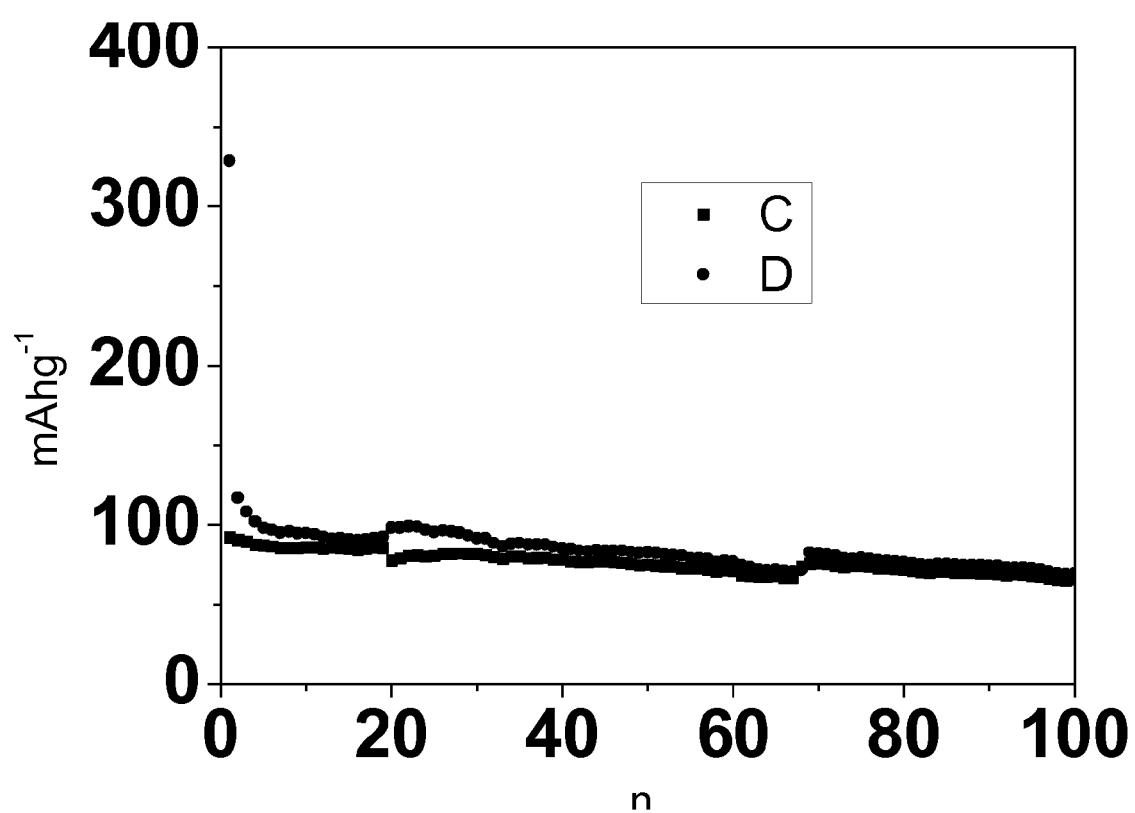
FIG. 11: Lithiation (D)—delithiation (C) capacity (in mAh/g of active material) of a battery using powder from CExample 6 at 100 $mAg^{-1}$

As in Example 1, the prepared $SiO_x$ composite powder is used as active material for negative electrode in lithium ion half-cell. The negative electrode is prepared and evaluated by a cell test. This sample delivered an initial lithiation capacity of 328 mAh/g, an initial delithiation capacity of 92 mAh/g, and a charge capacity of 65 mAh/g after 100 cycles indicating a low specific capacity and a low capacity retention (see FIG. 11).

Example 7

$SiO_x$/C/Mg

The pristine $SiO_x$ powder obtained in Example 1 is used as precursor to produce $SiO_x$/C/Mg. This metal oxide mixture is prepared by mixing 80 wt % of the $SiO_x$ with 20 wt % of metallic Mg (commercial product from Aldrich) in a planetary mixer during 1 h (with 650 rotation per minutes, weight ratio ball/powder:20/1). The oxygen ratio of the final powder is 15 wt %, and the particles remain micrometric (between 1 and 15 μm). The oxygen proportion seems to indicate that the oxygen content remains stable during this process.

A slurry is prepared using 50 wt % of this powder, 25 wt % of a Na-CMC binder (Molecular weight<200 000) and 25 wt % of a conductive additive (Super C65, commercial product from Timcal). In a first step, a 2.4% Na-CMC solution is prepared and dissolved overnight. Then, the conductive carbon is added to this solution and stirred for 20 minutes using a high-shear mixer. Once a good dispersion of the conductive carbon is obtained, the active material is added and the slurry is stirred again using a high-shear mixer during 30 minutes.

The electrodes are prepared by coating the resulting slurry on a copper foil (thickness: 17 μm) with a slurry layer thickness of 125 μm and then drying at 70° C. for 2 hours. Round electrodes are punched and dried at 150° C. during 3 hours in a small vacuum oven. The electrodes are electrochemically tested versus metallic lithium in coin cells prepared in a glovebox under dry argon atmosphere. The electrolyte used is 1M $LiPF_6$ in a mix of ethylene carbone (EC)/diethylcarbonate (DEC) (50/50 wt %)+10% fluoroethylecarbonate (FEC)+2% vinylene carbonate (VC) (commercial product of Semichem). The coin cells are tested in a continuous current (CC) mode between 10 mV and 1.5 V at a rate of C/5 (meaning a full charge or discharge of 500 mAh/g of active material in 5 hours). The batteries show similar results as the Example 1b, with a improvement of the coulombic efficiency.

Example 8

$SiO_x$/C Powder According to the Invention with Different Carbon Content

At room temperature, 7.44 ml TEOS (tetraethylorthosilicate), used as Si source, is dissolved in 125 ml water, wherein 1 g polyvinylpyrrolidone (PVP) is added. The solution is transferred to a 200 ml autoclave and hydrothermally treated at 130° C. for 1 h. At this stage the powder is a pure $SiO_2$ with appears amorphous in XRD but which is composed of nano-domains of crystallized $SiO_2$ (confirmed by TEM observations).

After cooling down to room temperature, the solution inside the autoclave is transferred into a flask. The solution is dried at 90° C. in a rotary evaporator under reflux conditions. The obtained viscous slurry is coked at 250° C. for 10 h in an oven and then calcined at 800° C. for 1 h in 5% $H_2$/Ar atmosphere to produce $SiO_x$/C composite powders. This product contains carbon, because PVP is added into the water during the hydrothermal process and the decomposition of TEOS produces molecules containing carbon which are not eliminated, so the obtained $SiO_x$ from the hydrothermal route is $SiO_x$ with some carbon compounds attached on the particle surface. After heat treatment, these compounds will decompose to carbon.

The powder is composed of many near-spherical particles with a size ca. 1 μm and a certain amount of aggregated large particles, as in the Example 1. The XRD of this $SiO_x$/C powder shows an amorphous state, but TEM observation revealed—as in Example 1—that the $SiO_x$ particles are actually composed of two distinct phases, well-ordered ($SiO_2$) phases and disordered phases (silicon). The oxygen content in the obtained SiO$_x$/C powder is 32 wt % The carbon content was measured at 5 wt %. So we have SiO$_x$/C with x=0.9.

Figure 12:
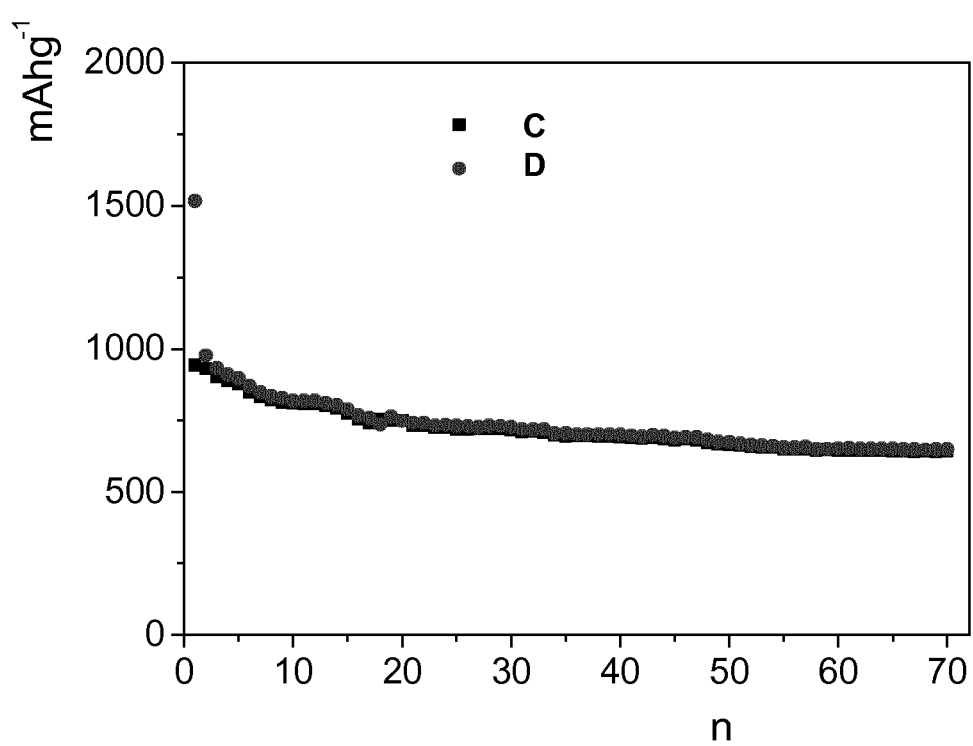
FIG. 12: Lithiation (D)—delithiation (C) capacity (in mAh/g of active material) of a battery using powder from Example 8 at 100 $mAg^{-1}$

The prepared SiO$_x$/C powder is evaluated as negative electrode material in the following cell test. Electrodes containing 70 wt % SiO$_x$/C powder (active material), 15 wt % acetylene black (conductive agent), and 15 wt % polyvinylidene fluoride (PVDF, binder) are prepared by coating the slurry of the electrode ingredients in N-Methyl-2-pyrrolidone (NMP) onto copper foil, which is dried at 120° C. in a vacuum oven for 24 h. The copper foil with electrode materials are then punched into circular discs with a diameter of 8 mm and vacuum dried overnight. The working electrodes are assembled in Swagelok cells using Celgard 2400 as separator and lithium foil as counter electrode. The electrolyte consists of 1M LiPF$_6$ in a non-aqueous solution of ethylene carbonate (EC), ethyl methyl carbonate (EMC) and dimethyl carbonate (DMC) (1:1:1 by volume). The cell is assembled in an Ar-filled glove box, with oxygen and water contents each less than 1 ppm. Galvanostatic cycling tests with metallic lithium as counter electrode are conducted on a battery test system, in a voltage range of 0.01-2.5 V vs. Li/Li$^+$ at a current density of 100 mAg$^{-1}$. The cell marks an initial (1st cycle) discharge capacity (delithiation) of 15000 mAh/g, and 600 mAh/g after 100 cycles (see FIG. 12).

The invention claimed is:

1. A negative electrode powder for a lithium-ion rechargeable battery comprising a mixture including carbon and SiO$_x$, with 0<x<1, wherein the SiO$_x$ comprises a composite of crystalline SiO$_2$ and amorphous Si wherein the mixing of SiO$_2$ and Si occurs over a scale of between 1 and 5 nm, characterized in that said mixture is free of SiO$_x$ domains that are larger than 100 nm.

2. The negative electrode powder of claim 1, wherein said mixture is free of SiO$_x$ domains that are larger than 50 nm.

3. The negative electrode powder of claim 1, wherein said mixture is free of SiO$_x$ domains that are larger than 20 nm.

4. The negative electrode powder of claim 1, wherein said mixture is not a core-shell structure with a core of SiO$_x$ and a shell comprising carbon.

5. The negative electrode powder of claim 1, wherein the powder has a d50 value between 0.8 and 8 µm.

6. The negative electrode powder of claim 1, wherein the powder has a BET value of less than 5 m$^2$/g.

7. The negative electrode powder of claim 1, wherein 0.5<x<1.

8. The negative electrode powder of claim 1, wherein in the mixture of carbon and SiO$_x$ the weight ratio SiO$_x$:C is between 33:1 and 1:1.

9. The negative electrode powder of claim 1, wherein the mixture further comprises M$_y$O, wherein M is a metal with an oxidation number of z, with z * y=2, and wherein M is selected from the group consisting of Al, Ca, Mg, Ti, Li and combinations thereof.

10. A negative electrode comprising 50 to 95 wt % of the negative electrode powder of claim 1, 2.5 to 25 wt % of a conductive agent and 5 to 25 wt % of a binder material.

11. A process for preparing the negative electrode powder of claim 1, comprising:
providing an aqueous solution comprising an anti-agglomeration agent,
dispersing a silicon comprising organic compound in the aqueous solution,
hydrothermally treating the aqueous solution at a temperature between 90 and 180° C. for a period of 0.5 to 24 h, thereby forming a suspension of SiOx in the aqueous solution,
evaporating the solution, thereby obtaining a slurry,
subjecting the slurry to a coking process whereby a solid residue is formed, and
calcining the solid residue at a temperature between 500 and 1300° C. in a non-oxidizing atmosphere.

12. The process according to claim 11, wherein the calcination of the solid residue is performed in a reducing atmosphere comprising H$_2$ or CH$_4$.

13. A process for preparing the negative electrode powder of claim 1, comprising:
providing a first aqueous solution comprising an anti-agglomeration agent,
dissolving an organic carbon source in a second solution,
dispersing a silicon comprising organic compound in the first aqueous solution,
hydrothermally treating the first aqueous solution at a temperature between 90 and 180° C. for a period of 0.5 to 24 h, thereby forming a suspension of SiOx in the first aqueous solution,
mixing the first aqueous solution and the second solution, thereby obtaining a third solution,
evaporating the third solution at a temperature below the boiling point of the second solution, thereby obtaining a slurry,
subjecting the slurry to a coking process whereby the organic carbon source is decomposed and a solid residue is formed, and
calcining the solid residue at a temperature between 500 and 1300° C. in a non-oxidizing atmosphere.

14. The process according to claim 11, wherein the anti-agglomeration agent contains carbon.

15. The process according to claim 14, wherein the anti-agglomeration agent comprises polyvinyl pyrrolidone or a vinyl pyrrolidone-vinyl ester copolymer.

16. The process according to claim 13, wherein the second solution is a second aqueous solution, and the content of the organic carbon source in the second solution is between 100 and 300 g/l.

17. The process according to claim 13, wherein quantities of the organic carbon source and the silicon comprising organic compound are provided so as to obtain a weight ratio SiO$_x$:C between 33:1 and 1:1 in the mixture of carbon and SiO$_x$.

* * * * *